Nov. 28, 1961   J. O. MELTON ET AL   3,010,746
PIVOTAL ASSEMBLY FOR RELATIVELY OSCILLATING MEMBERS
Filed Dec. 7, 1959   2 Sheets-Sheet 1

INVENTORS.
JAMES O. MELTON &
BY THOMAS B. WILKINSON

ATTORNEY

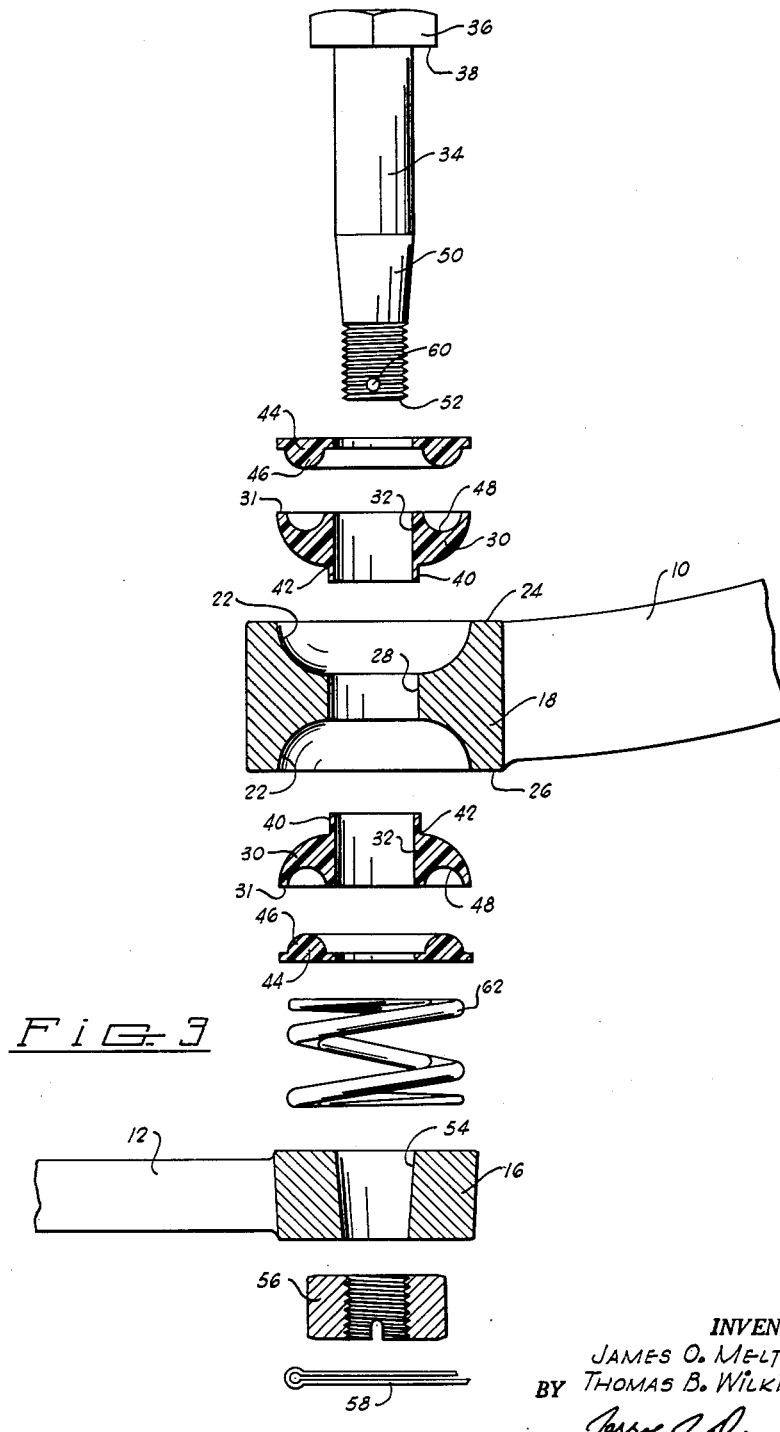

United States Patent Office 3,010,746
Patented Nov. 28, 1961

3,010,746
PIVOTAL ASSEMBLY FOR RELATIVELY
OSCILLATING MEMBERS
James O. Melton, Norman, and Thomas B. Wilkinson, Oklahoma City, Okla., assignors to Jamco, Inc., Oklahoma City, Okla., a corporation of Oklahoma
Filed Dec. 7, 1959, Ser. No. 857,634
8 Claims. (Cl. 287—85)

This invention relates generally to improvements in pivotal joints or assemblies for relatively oscillating members, and more particularly, but not by way of limitation, to improvements in idler arm assemblies in automotive steering linkages.

Some modern automobiles have a steering linkage of the relay type wherein the steering gear pitman is connected to one end of a relay rod by a ball and socket joint. The relay rod extends laterally under the automobile and is pivotally connected to one end of an idler arm. The opposite end of the idler arm is in turn connected to a support bracket bolted to the automobile chassis at the side of the automobile opposite the steering gear. Tie-rods are connected to intermediate portions of the relay rod and extend to the steering arms.

The function of the idler arm is to stabilize and support the relay rod at the end of the rod opposite the steering gear. The pivotal joints at each end of the idler arm must be tight enough to provide firm support for the relay rod, and yet the joints must pivot easily in order not to unduly increase the steering effort required. Because of the severe service conditions to which the idler arm is exposed, the joints tend to wear rapidly and soon become loose, causing play in the steering linkage and decreasing the safety of the steering mechanism.

In our co-pending application entitled "Idler Arm Bearing and Assembly" filed September 24, 1959, Ser. No. 842,016, we disclose and claim a bearing assembly utilizing high density synthetic resin bearing members adapted for use in an existing idler arm hub, wherein the idler arm is utilized as a portion of a steering mechanism of different construction than the steering mechanism which gave rise to the present invention. In said co-pending application, sufficient space is available to construct the synthetic resin bearing members of substantial size and thickness for sufficient strength in the particular environment. However, in a steering mechanism of the relay type, space for bearing members at the opposite ends of the idler arm is at a premium and the bearing construction shown in the co-pending application would be inappropriate.

The present invention contemplates an improved idler arm assembly utilizing self lubricating, low friction bearings constructed in such a manner that the bearings occupy the minimum space and yet provide the necessary strength to minimize play in the idler arm assembly. The bearings are formed of high density synthetic resin materials to provide an economical construction requiring no lubrication and yet having a long service life. Stated broadly, the present invention may be defined as a pivotal assembly, comprising an idler arm having a hub on one end thereof, said hub having an upper face and a lower face and a socket in each of said faces in the form of a portion of a sphere, said sockets being aligned and said hub having a bore therein between said sockets, a shaft extending through said sockets and bore for pivotally supporting the respective end of the idler arm, said shaft being of a size to extend loosely through said bore and having a circumferential shoulder on one end thereof, a high density synthetic resin bearing member in each of said sockets around the shaft, each of said bearing members being shaped in the form of a portion of a sphere to mate with the respective socket and being of a size to fit tighter in the respective socket than around said shaft to turn with the idler arm around said shaft, each of said bearing members having an inner end and an outer end and being of a length to position the outer end thereof substantially even with the respective face of the idler arm hub when positioned in the respective socket, upper and lower bearing washers around said shaft in contact with the outer ends of the respective bearing members, and means yieldably retaining the bearing members, bearing washers and hub in assembly on the shaft with one of the bearing washers against said circumferential shoulder.

An important object of this invention is to provide an improved idler arm and bearing construction wherein the idler arm will be retained firmly in the desired position and yet may be easily pivoted in the desired direction.

Another object of this invention is to provide a pivotal idler arm assembly which is simple in construction, economical to manufacture and which has a long service life.

Another object of this invention is to provide a pivotal assembly wherein the bearing surfaces are self lubricating.

A further object of this invention is to provide a pivotal assembly wherein all parts of the assembly are self aligning.

A still further object of this invention is to provide a pivotal assembly utilizing high density synthetic resin materials for the bearings, and wherein the bearings occupy the minimum space.

Other objects and advantages of the invention will be evident from the following detailed description, when read in conjunction with the accompanying drawings, which illustrate our invention.

In the drawings:

FIGURE 3 is an exploded view of the pivotal assembly of this invention.

Figure 1:
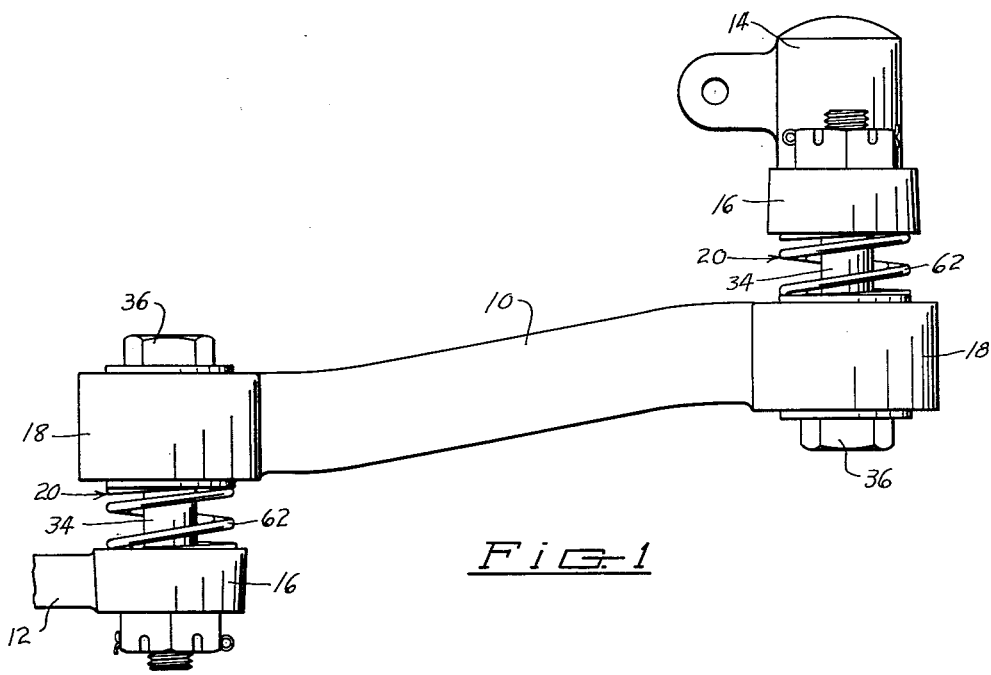
FIGURE 1 is an elevational view of an idler arm assembly constructed in accordance with this invention.

Referring to the drawings in detail, and particularly FIG. 1, reference character 10 designates an idler arm constructed in accordance with this invention and which is pivotally connected between a relay rod 12 and a bracket 14. It will be understood that both the relay rod 12 and the bracket 14 are portions of an existing steering mechanism, and each of these members is provided with a hollow hub 16 which is utilized in the connection of the respective member with the idler arm 10, as will be described below. Although the idler arm 10 was devised for replacing an idler arm (not shown) provided by the automobile manufacturer between the relay rod 12 and the bracket 14, it will be understood that the idler arm 10 could be provided as a portion of the original steering mechanism.

A hollow hub 18 is provided at each end of the idler arm 10 and forms a portion of a novel pivotal assembly generally designated by reference character 20, for pivotally connecting the idler arm 10 between the relay rod 12 and the bracket 14. Each of the pivotal assemblies 20 is constructed in the same way and a detailed description of only one of these pivotal assemblies is sufficient to clearly illustrate our invention.

As shown most clearly in FIG. 3, the idler arm hub 18 at each end of the idler arm 10 has a socket 22 formed in each of the upper and lower end faces 24 and 26 thereof. Each socket 22 is in the form of a portion of a sphere and the sockets 22 are vertically aligned. A bore 28 extends vertically through the medial portion of the hub 18 between the sockets 22, and it will be observed that the diameter of the bore 28 is substantially less than the largest diameter of either of the sockets 22.

Figure 2:
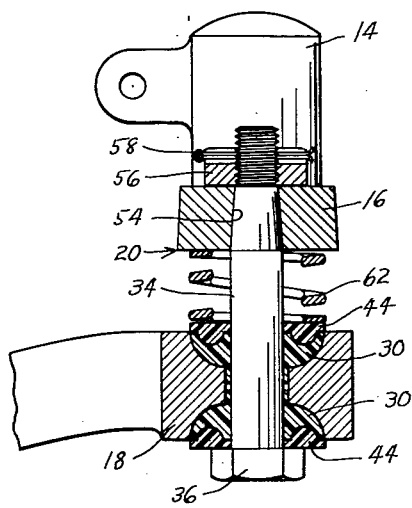
FIGURE 2 is a vertical sectional view through one end of the idler arm illustrated in FIG. 1.

A novel bearing member 30 is supported in each of the sockets 22 to provide upper and lower bearing members in the upper and lower ends of the hub 18 in the manner illustrated in FIG. 2. Each bearing member 30 (FIG. 3) is in the form of a portion of a sphere to mate with the walls of the respective socket 22 and is of a size to position its outer end 31 substantially even with the respective end face of the hub. Also, each bearing member 30 is provided with a vertically extending bore 32 through the central portion thereof. The bores 32 are provided to receive a shaft 34 which may be conveniently in the form of a bolt having a head portion 36 which forms a downwardly facing circumferential shoulder 38 at the upper end of the bolt when the bolt is extended in the direction shown in FIG. 3. It may also be noted here that each bearing member 30 is of a size to fit tighter in the respective socket 22 than around the shaft 34, such that the bearing members 30 will tend to pivot with the respective hub 18 during pivotation of the idler arm 10. Also, a tubular extension 40 is preferably provided on the inner end 42 of each of the bearing members 30 and is of a size to fit tightly in the bore 28 of the hub 18 to additionally secure the bearing members in the hub 18. It will be understood that the length of each extension 40 is less than one-half the length of the bore 28, such that both of the extensions 40 may be fitted in the bore 28 without interference, in the manner illustrated in FIG. 2.

A bearing washer 44 is positioned loosely on the shaft 34 above the upper bearing member 30 and below the lower bearing member 30 to cooperate with the bearing members 30 in journaling the hub 18 on the shaft 34 with a minimum of friction. In a preferred construction, a circumferential flange or bead 46 is provided on the face of each bearing washer 44 adjacent the respective bearing member 30 and is of a size to mate with a corresponding circumferential groove 48 formed in the outer face 31 of the respective bearing member. Thus, the bearing washers 44 will be provided with substantial thickness to prevent their becoming bent or distorted in use, particularly when the bearing washers 44 are formed of a high density synthetic resin material, as will be described below. The cooperating flanges 46 and grooves 48 also facilitate the maintenance of alignment between the bearing washers 44 and the bearing members 30, which enhances an efficient operation of the pivotal assembly.

A portion 50 of the shaft 34, adjacent the lower end 52 of the shaft, is tapered to mate with a tapered bore 54 extending through the respective hub 16 of the steering rod 12 or bracket 14. Also, a castle nut 56 is threaded onto the lower end 52 of the shaft 34 against the respective hub 16 to wedge the mating surfaces 50 and 54 into tight engagement and assure that the respective hub 16 will remain fixed with respect to the shaft 34. Normally, a cotter pin 58 extends through an aperture 60 in the lower end portion of the shaft 34 below the nut 56 to hold the nut 56 in a locked position of the shaft 34.

In order to retain the pivotal assembly in a firm vertical position, we telescope a helical spring 62 around the shaft 34 between the respective hub 16 and the adjacent bearing washer 44. The spring 62 is of a size to constantly retain a force on the head 36 of the shaft 34 to force the downwardly facing shoulder 38 into engagement with the upper bearing washer 44 and to retain the upper end of the spring 62 in compressive contact with the lower bearing washer 44. Thus, the spring 62 will urge the bearing washers 44 against the respective bearing members 30 and retain the various portions of the pivotal assembly in the desired relations, yet the parts of the pivotal assembly will be yieldably urged together, such that any wear which may occur will be taken up by the spring 62 and the desired load on the bearings will be maintained. Also, the spring 62 retains the upper bearing washer 44 fixed against the shoulder 38 and the lower bearing washer 44 fixed against the upper end of the spring, such that pivotation of the idler arm will provide movement at the contacting surfaces of the bearing washers and bearing members.

As previously indicated, the bearing members 30 and bearing washers 44 are formed of high density synthetic resin materials, such, for example, as a high density tetra-fluoroethylene polymer (sold under the trademark Teflon), a polyamide resin material (sold under the trademark nylon) or a synthetic polyolefin resin (sold under the trademark Marlex). The bearing members 30 and bearing washers 44 are preferably formed of dissimilar high density synthetic resin materials. We have found that when the bearing members 30 are formed of a synthetic polyolefin resin and the bearing washers 44 are formed of a polyamide resin material, the bearing members and washers provide an efficient bearing assembly which will not require lubrication and which will have long service life. It may also be noted here that these high density synthetic resin materials will absorb shocks which are inherently encountered in a steering mechanism, without damage or prevent distortion of the bearing members or washers.

When the idler arm 10 is connected to the relay rod 12 and bracket 14 by means of the pivotal assemblies 20, the idler arm 10 will be firmly held in the desired plane of pivotation to support the relay rod 12. The springs 62 will constantly tend to take up any wear which occurs and will retain the idler arm 10 firmly connected to both the relay rod 12 and bracket 14. However, the cooperating bearing members 30 and bearing washers 44 at each end of the idler arm 10 will provide a minimum of friction, for an efficient and easy operation of the relay rod 12 during use of the steering mechanism in which the invention is utilized. It may also be noted that the partially spherical configuration of the bearing members 30 provides these members with a minimum height, yet with sufficient strength to withstand the forces normally imposed thereon without a breakdown of the pivotal assembly. It has been previously noted that the flanges 46 on the bearing washers 44 increase the strength of these members sufficiently to prevent bending of these washers during operation of the device, without requiring an increase in space for their use.

From the foregoing, it will be apparent that the present invention provides a novel idler arm pivotal assembly which will maintain a firm joint and at the same time allow easy pivotal action of the idler arm. It will also be apparent that all of the bearing surfaces are self-lubricating, that the various portions of the bearings will be self-aligning to retain the pivotal assembly in operating condition, and that the assembly will require a minimum of space. Also, the spring retains the various elements of the pivotal assembly in the desired relationships and will accommodate any wear which might occur. Finally, it will be apparent that the present invention provides a novel pivotal assembly which is simple in construction, may be economically manufactured and which has a long service life.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

We claim:

1. A pivotal assembly, comprising an idler arm having a hub on one end thereof, said hub having an upper face and a lower face and a socket in each of said faces in the form of a portion of a sphere, said sockets being aligned and said hub having a bore therein between said sockets, a shaft extending through said sockets and bore for pivotally supporting the respective end of the idler arm, said shaft being of a size to extend loosely through said bore and having a circumferential shoulder on one end thereof, a high density synthetic resin bearing member in each of said sockets around the shaft, each of said bearing members being shaped in the form of a portion of a sphere to mate with the respective socket and being of a size to fit tighter in the respective socket than around said shaft to turn with the idler arm around said shaft, each of said bearing members having an inner end and an outer end and being of a length to position the outer end thereof substantially even with the respective face of the idler arm hub when positioned in the respective socket, upper and lower bearing washers around said shaft in contact with the outer ends of the respective bearing members, and means yieldably retaining the bearing members, bearing washers and hub in assembly on the shaft with one of the bearing washers being held against said circumferential shoulder.

2. An assembly as defined in claim 1 wherein each of said bearing washers is formed of a high density synthetic resin.

3. An assembly as defined in claim 2 wherein said bearing washers and bearing members are formed of different high density synthetic resin materials.

4. An assembly as defined in claim 2 wherein the outer end of each bearing member has a circumferential groove therein and the respective bearing washer has a circumferential flange on one face thereof mating with the respective circumferential groove.

5. An assembly as defined in claim 1 wherein each bearing member has a tubular extension on the inner end thereof of a size to fit tightly in said bore and loosely around said shaft.

6. An assembly as defined in claim 1 wherein said means for retaining the bearing members, bearing washers and hub in assembly on said shaft comprises a nut secured on the end of the shaft opposite said circumferential shoulder, and a helical spring around the shaft between said nut and the adjacent bearing washer, said spring being of rectangular cross section with every portion thereof having a width-to-thickness ratio substantially greater than unity.

7. An assembly as defined in claim 3 wherein said bearing washers are formed of a polyamide resin material and said bearing members are formed of a synthetic polyolefin resin.

8. An assembly as claimed in claim 1 wherein said spherical-shaped sockets subtend an angle of at least 90 degrees.

References Cited in the file of this patent

UNITED STATES PATENTS

| | | |
|---|---|---|
| 1,853,991 | Olesen | Apr. 12, 1932 |
| 2,477,447 | Fawick | July 26, 1949 |

FOREIGN PATENTS

| | | |
|---|---|---|
| 683,446 | Great Britain | Nov. 26, 1952 |

UNITED STATES PATENT OFFICE

CERTIFICATE OF CORRECTION

Patent No. 3,010,746                              November 28, 1961

James O. Melton et al.

It is hereby certified that error appears in the above numbered patent requiring correction and that the said Letters Patent should read as corrected below.

Column 4, line 24, for "prevent" read -- permanent --.

Signed and sealed this 17th day of April 1962.

(SEAL)
Attest:

ESTON G. JOHNSON                           DAVID L. LADD

Attesting Officer                                Commissioner of Patents